(No Model.)

L. BRONSON.
THRASHING MACHINE.

No. 418,365. Patented Dec. 31, 1889.

Witnesses:
Theo. L. Popp
Chas. J. Buchheit

Levi Bronson Inventor,
By Wilhelm Bonner
Attorneys

UNITED STATES PATENT OFFICE.

LEVI BRONSON, OF BUFFALO, NEW YORK, ASSIGNOR OF ONE-HALF TO THE PITTS AGRICULTURAL WORKS, OF SAME PLACE.

THRASHING-MACHINE.

SPECIFICATION forming part of Letters Patent No. 418,365, dated December 31, 1889.

Application filed June 13, 1887. Serial No. 241,134. (No model.)

*To all whom it may concern:*

Be it known that I, LEVI BRONSON, of the city of Buffalo, in the county of Erie and State of New York, have invented new and useful Improvements in Thrashing-Machines, of which the following is a specification.

This invention relates to the cylinder and concave of thrashing-machines, and has the object to provide simple and inexpensive means for securing the teeth to the cylinder and concave which will permit the teeth to be arranged very closely together, so as to effect a fine and thorough cutting of the straw.

The invention consists of the improvements, which will be hereinafter fully set forth, and pointed out in the claim.

Figure 1:
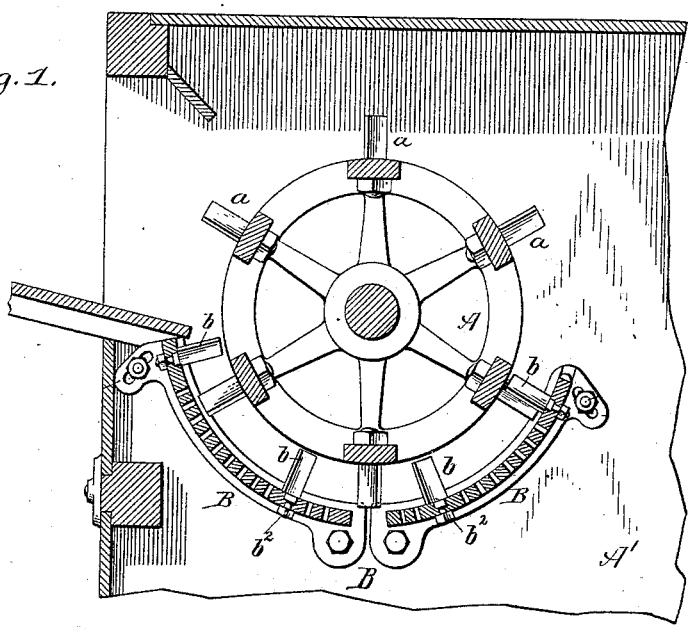
Figure 2:
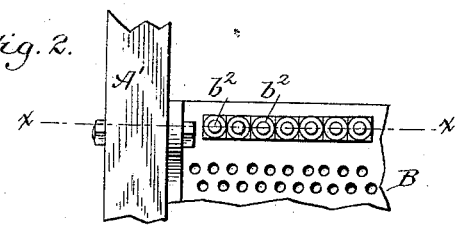
Figure 4:
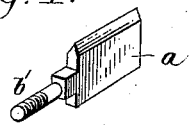
Figure 3:
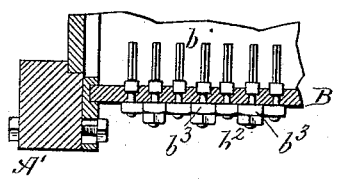
Figure 5:
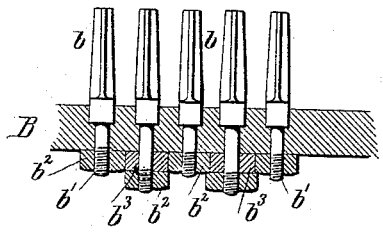
Figure 6:
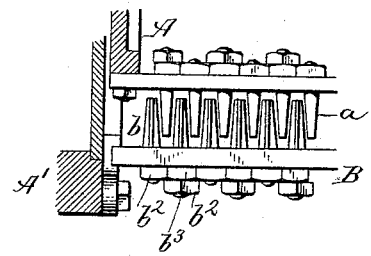

In the accompanying drawings, Figure 1 is a fragmentary longitudinal section of a thrashing-machine provided with my improved cylinder and concave. Fig. 2 is a fragmentary end view of the concave. Fig. 3 is a horizontal section in line $x$ $x$, Fig. 2. Fig. 4 is a perspective view of one of the teeth secured to the cylinder-concave. Fig. 5 represents a cross-section on an enlarged scale, showing the manner of securing the teeth to the thrashing cylinder and concave. Fig. 6 is a fragmentary sectional top plan view of the cylinder and concave.

Like letters of reference refer to like parts in the several figures.

A represents the thrashing-cylinder, arranged in the upper portion of the frame A' in the usual manner and provided with teeth or knives $a$; and B represents the concave, arranged below the cylinder A and provided with teeth or knives $b$, the teeth $a$ of the thrashing-cylinder moving in the spaces between the teeth $b$ of the concave in a well-known manner. The teeth of the knives of the concave are provided with screw-threaded shanks $b'$, which are seated in openings formed in the concave, and are secured therein by screw-nuts $b^2$, applied to the outer ends of the shanks. The inner portion of the shanks $b'$ and of the openings in which said shanks are arranged are made square to prevent the teeth from turning. The shank of every other or alternate tooth is provided with a block or washer $b^3$, which is inserted over the shank before applying the screw-nuts thereto. The washers or blocks $b^3$ are preferably about the same size as the screw-nuts, and the shanks upon which the blocks $b^3$ are applied are made somewhat longer than the shanks that are not provided with the blocks.

In applying the knives to the concave the knives having the short shanks are secured in every other or alternate opening in the concave, whereby a sufficient space is left between the shanks to apply the screw-nuts thereto. The knives having the long shanks are then placed in the remaining openings between the knives having the short shanks. The blocks or washers $b^3$ are first slipped over the long shanks before applying the screw-nuts thereto, so that when the screw-nuts are turned home on the long shanks the washers or blocks $b^3$ will be forced between the two adjacent nuts on the short shanks and prevent said nuts from turning or becoming loose. The knives in the cylinder are secured in place in a similar manner. This construction permits the knives in the cylinder and concave to be arranged closer together than by the ordinary manner of fastening, and enables a larger number of knives or teeth to be employed without increasing the size of the cylinder or concave. By arranging the teeth or knives in this manner the straw in passing between the cylinder and concave is broken more thoroughly and finer and a better separation of the grain from the straw is effected.

I claim as my invention—

In a thrashing-machine, the combination, with the cylinder or concave having openings or perforations, of a series of knives provided with screw-threaded shanks arranged in said openings, screw-nuts applied to the shanks of alternate knives, washers applied to the shanks of the intermediate or intervening knives between the nuts of the adjacent knives, and screw-nuts whereby said washers are secured in place, substantially as set forth.

Witness my hand this 12th day of March, 1887.

LEVI BRONSON.

Witnesses:
JNO. J. BONNER,
CARL F. GEYER.